N. POWER.
PROJECTING APPARATUS.
APPLICATION FILED JULY 14, 1914.
1,184,126.
Patented May 23, 1916.
4 SHEETS—SHEET 3.
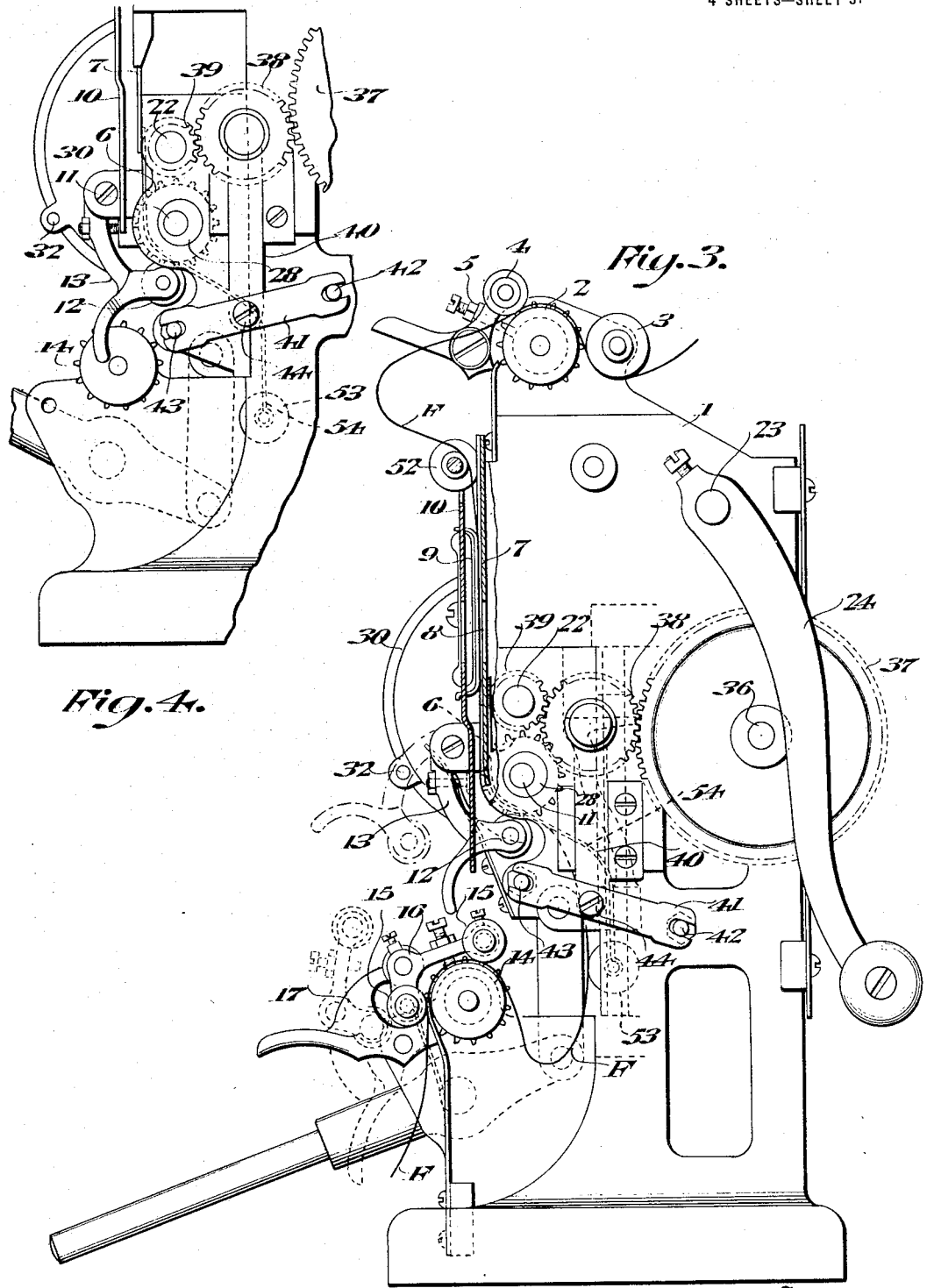

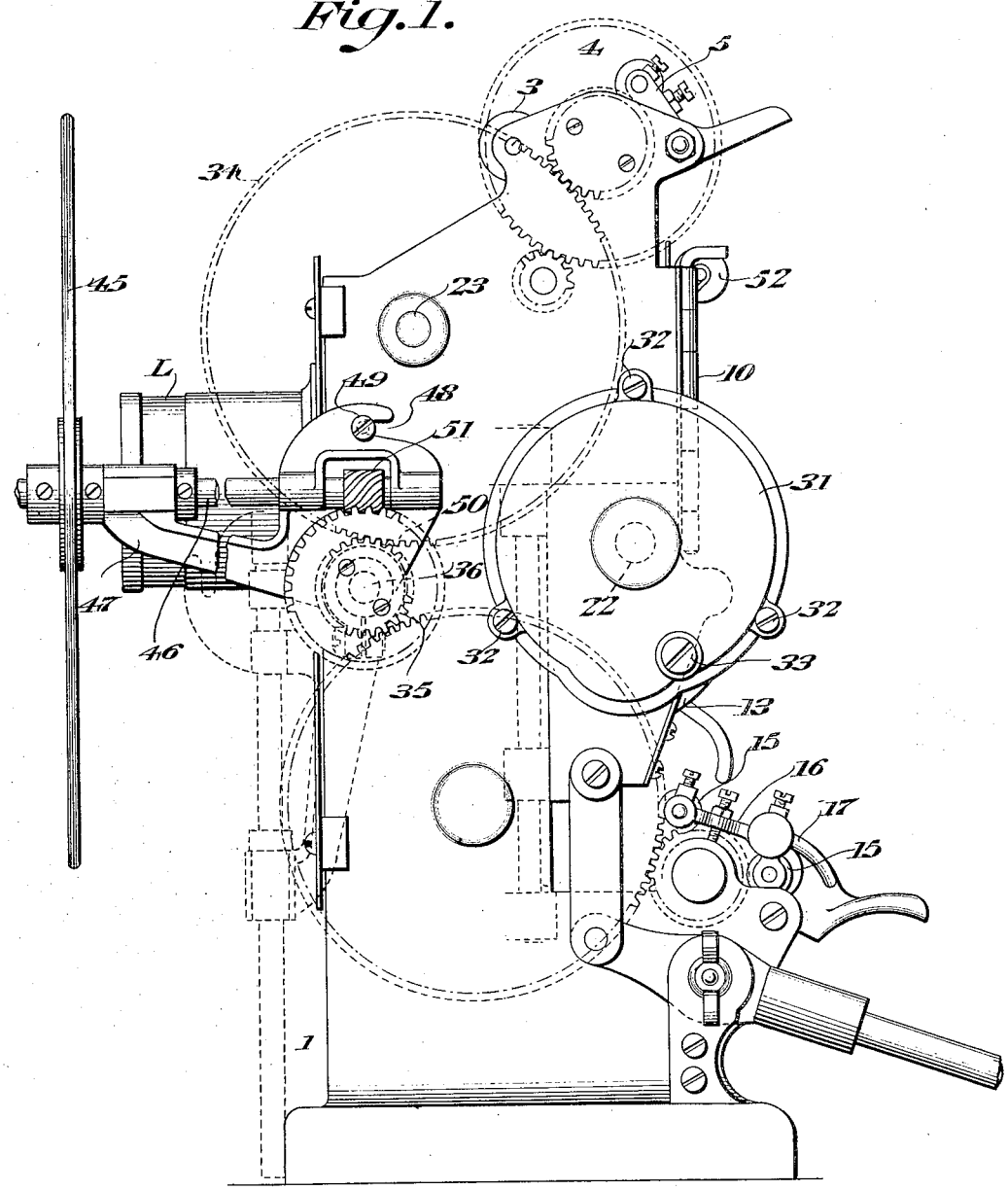

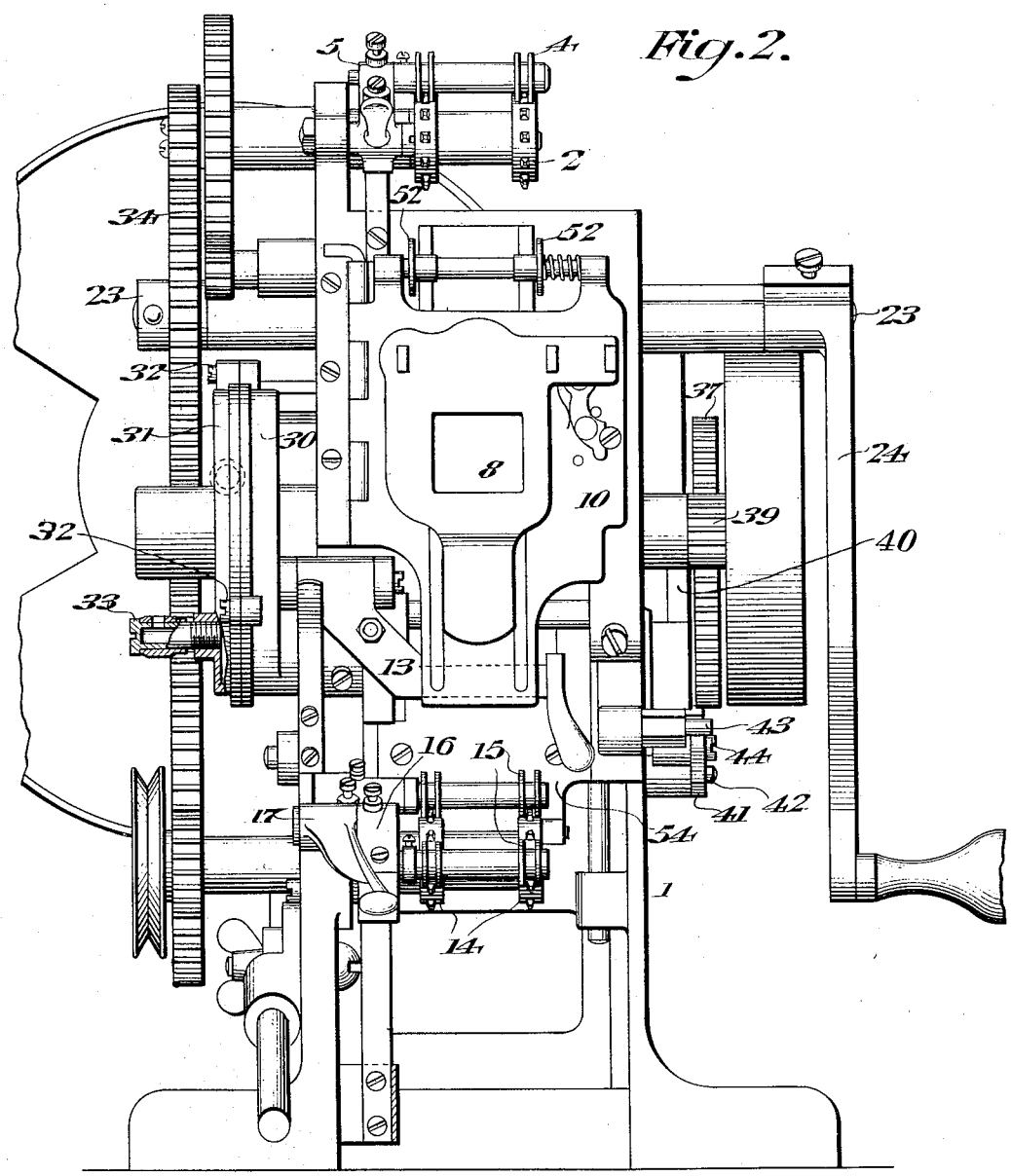

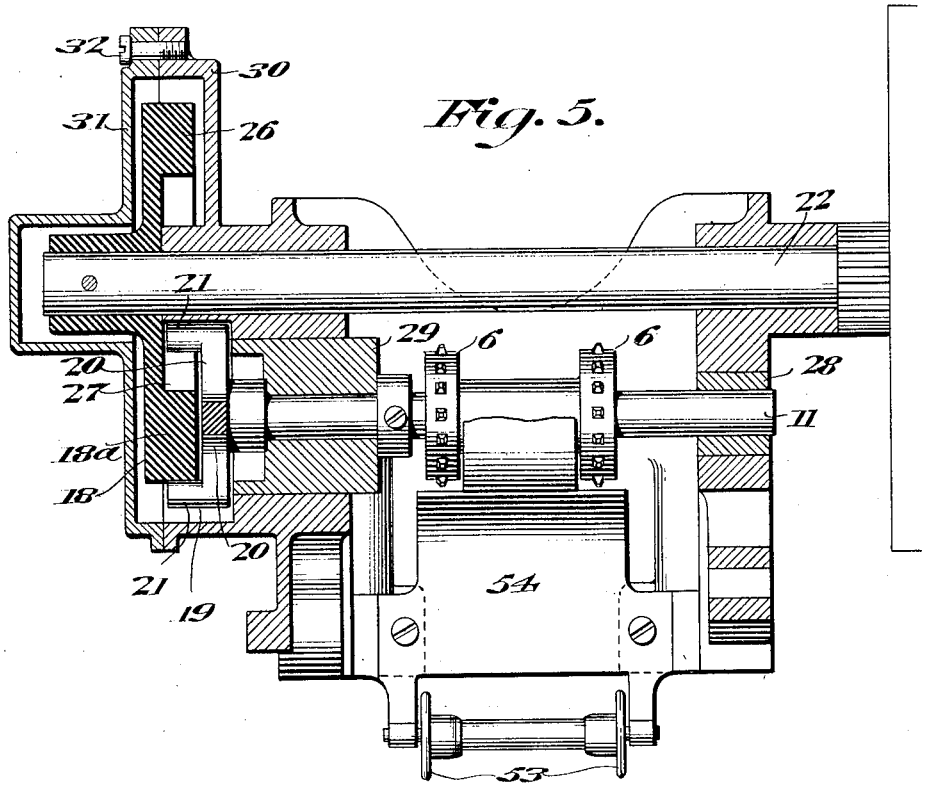
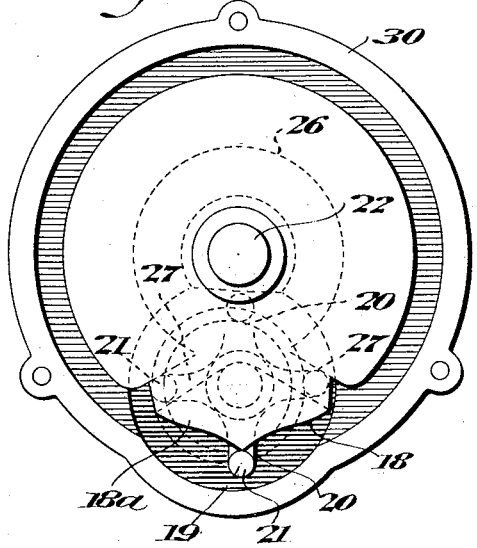
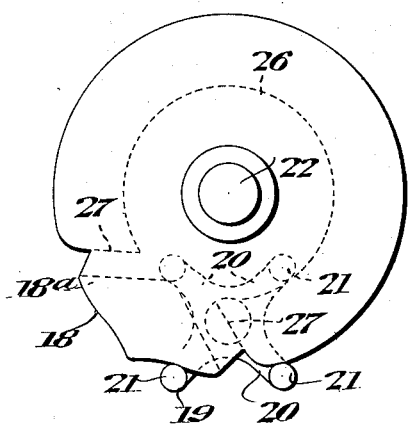

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

PROJECTING APPARATUS.

1,184,126.   Specification of Letters Patent.   Patented May 23, 1916.

Original application filed October 4, 1910, Serial No. 585,202. Divided and this application filed July 14, 1914. Serial No. 850,873.

*To all whom it may concern:*

Be it known that I, NICHOLAS POWER, a citizen of the United States, and a resident of Brooklyn, in the county of Kings and State of New York, have invented certain new and useful Improvements in Projecting Apparatus, of which the following is a specification.

This invention relates to motion picture projecting apparatus, and this application constitutes a division of my prior application #585,202, filed October 4, 1910, now matured into Patent No. 1,129,121 dated Feb. 23, 1915, which patent is restricted to the mechanism, by means of which an intermittent movement is imparted to the strip, or film, bearing the picture to be projected.

One object of the invention of this application is to provide improved devices for "framing" or properly centering the pictures on the film in the picture gage or projection aperture on the apparatus.

A further object of the invention is to improve the projecting apparatus for moving pictures with respect to the reduction of the wear upon the film in its passage through the apparatus.

A further object of the invention is to provide projecting apparatus of the character specified in which the parts are so arranged and combined that the apparatus may be conveniently assembled or disassembled for cleaning or repairs.

Other objects of the invention will occur in the course of the following description wherein reference is made to the accompanying drawings, in which is illustrated a single embodiment of the invention.

Figure 1 is a view of the side elevation of the complete mechanism, parts being shown in dotted lines; Fig. 2 is a view in rear elevation of the complete mechanism; Fig. 3 is a view in side elevation taken from the side opposite to that shown in Fig. 1; Fig. 4 is a view in side elevation of the mechanism for centering the picture, the parts being shown in different position from that shown in Fig. 3; Fig. 5 is a view in horizontal section through the framing carriage in the plane of the axis of the main driving spindle 22; Fig. 6 is a detail view from the left of the mechanism for producing intermittent movement; Fig. 7 is a detail view of the mechanism for producing intermittent movement showing the parts in different position from that shown in Fig. 6.

Referring to the drawings by the reference characters 1 designates the main frame of the machine, which affords support for the mechanism. On the top of this is mounted a sprocket 2 which is driven continuously to supply film to an intermittently moving sprocket below. In front of the sprocket 2 is a flanged guide roller 3, under which the film passes to the sprocket 2, and at the back of the sprocket 2 is a roller 4, mounted on a pivoted spring-pressed bracket 5. The roller 4 serves to hold the film in engagement with the sprocket. From the sprocket 2 the film passes to another sprocket 6, which is rotating intermittently, ¼ of a revolution at each movement, by a mechanism that will hereinafter be described. The sprocket 6 is located below the plate 7 in which is cut an opening 8 which serves as a picture gage or projection aperture. Against this plate the film is held by means of a pair of springs 9 carried by a hinged gate 10 at the back of the mechanism. A sufficient length of film is left between the sprockets 2 and 6 to permit the formation of a considerable loop in the film F at the top of the gate, as shown in Fig. 2. The sprocket 6 is mounted on a spindle or shaft 11 which is mounted in a vertically shiftable carriage, which is arranged to slide on suitable guides in the main frame 1. The film is held in engagement with this intermittently moving sprocket 6 by means of a roller 12 carried by a pivoted bracket 13 spring-pressed into operative position. It will be noted that the roller lies immediately under the sprocket, when in operative position, and insures the engagement of the film with at least ¼ of the teeth on the sprocket.

From the sprocket 6 the film passes to a lower sprocket 14 which is carried by the main frame. This sprocket revolves continuously when the apparatus is in operation and the film is held thereon by means of a pair of rollers 15 carried by a yoke 16 which is arranged to rock on a spring-pressed bracket 17. These rollers insure engagement of the film with about ⅓ of the teeth on the sprocket, and the rocking yoke by which the rollers are carried causes the rollers to position themselves automatically in proper relation to the sprocket when the bracket carrying the yoke is placed into position by its spring. Considerable slack is left in the film between the intermittently moving sprocket 6 and the lower continuously moving sprocket 14, so that a loop similar to that at the top of the mechanism, may be formed between the two sprockets.

The mechanism for imparting the intermittent movement to the sprocket 6 consists of two members 18 and 19, the former comprising a cam 18$^a$ of approximately diamond shape, and the latter consisting preferably of a cross, having four arms 20, arranged at right angles to each other, and each bearing near its outer end a pin 21. The cam 18 is mounted upon a heavy shaft 22, to which motion is imparted by any suitable means, as by means of a train of gearing arranged between it and a shaft 23 on which is secured a crank 24 for operating the mechanism by hand power. The details of the gearing provided for this purpose will be hereinafter described in connection with other pieces of the mechanism. The driven member 19 is mounted on a spindle 11 which also has bearings in the carriage and is arranged just below the main or cam shaft. The cam member 18 is preferably cut from a single block of steel and comprises in addition to the cam proper 18$^a$ a locking ring 26, which is concentric with the shaft on which the member 17 is mounted. This locking ring is of such width that it will just pass between the pin or studs on the driven member 19, two studs lying within the ring and two without. The ring is incomplete and the ends are spaced from the sides of the cam proper, as shown in Fig. 6. The ends of the ring are so shaped that passages 27, of a suitable width to just permit the studs on the driven member to pass therethrough are left between the ends of the ring and the sides of the cam proper 18$^a$. When the apparatus is in operation the cam member is driven at a speed ranging from about 800 revolutions per minute to a speed of 1200 or more revolutions per minute, and, as considerable energy is required to impart the intermittent rotation to the driven member 19, its spindle and the sprocket mounted thereon, the member 18, and the spindle upon which it is carried, are made quite massive so as to insure rigidity and resistance. It is also preferable that the cam member be made of tool steel adapted to be tempered, and that the cam proper at least be tempered so as to withstand wear and shock.

The spindle 11 is journaled in slightly eccentric bushings 28, 29, the former being small in diameter and the latter relatively large. It will be noted on comparison of the diameters of the bushing 29 and the sprocket carried on the spindle 11, that the bushing is of the larger diameter. The purpose of this construction is to permit the removal of the spindle and the sprocket from its position in the framing carriage without detaching the sprocket from the spindle. This is easily accomplished by merely loosening the screw which holds the bushing in place and sliding the bushing, spindle and sprocket through the opening in the framing carriage provided for the bushing.

To insure long service of the mechanism for imparting intermittent movement to the parts, they are inclosed in a dust proof casing consisting of an inner part, 30, and an outer part, 31. The former is cast integral with the framing carriage and the latter is in the form of a cap which is secured to the inner member of the casing by means of screws 32.

It will be noted that the general outline of the casing is circular, but a smaller cavity or sprocket is formed at the lower part thereof to provide clearance for the turning of the driven member on the intermittent movement. The oiling device 33 is secured on the outer member of the casing adjacent to this cavity to permit the easy introduction of oil into the casing. This oiling device is placed near the bottom of the casing so that it will be impossible to introduce a large quantity of oil into the casing, which is objectionable because of its tendency to work its way through the bearings for the spindles which extend into the casing, and so escape on to the film as it passes through the apparatus.

The gearing system by means of which motion is transmitted from the crank shaft 23 to the continuously rotating shaft 22 on the shiftable framing carriage comprises a large gear 34 on the end of the shaft 23 opposite the crank, the pinion 35 on the shaft 36, a large gear 37 on the shaft 36, a shiftable idler gear 38, and a pinion 39 on the shaft 22. In order to keep gears 37 and 38 and the pinion 39 properly in mesh in all positions of the framing carriage which carries shaft 22, the gear 38 is mounted upon a spindle supported in a slide 40 which is moved up and down simultaneously with the framing carriage, but has a smaller range of movement. The slide 40 is actuated by means of a lever 41 which is slotted on each end, one end engaging a fixed pin 42 in the main frame of the machine and the other engaging a pin 43 fixed in the framing carriage. The slide 40 is pivotally connected with the lever 41 by means of a screw 44 approximately midway between the ends of the lever. Consequently, as the framing carriage is moved upward the slide 40 bearing the gear 38 also travels upward and when the framing carriage moves downward the slide 40 and the gear 38 also move down, the extent of movement of the slide 40 being such that the center of the gear 38 is never far from a line connecting the centers of the gear 37 and the pinion 39, thus insuring the proper meshing of the train of gears in all positions of the framing carriage.

The shutter for cutting off the light from the screen during the movement of the film is supported in front of the lens L, as shown at 45 in Fig. 1. This shutter is carried by a spindle 46 which is supported in a bracket 47 which is clamped snugly on the shaft 36. This bracket 47 is provided with a notch 48 to receive a clamping screw 49 by which it is clamped in horizontal position as shown in solid lines in Fig. 1. For convenience in packing the machine, the bracket 47 is not held permanently in the position shown in solid lines in Fig. 1, but may be lowered to the position shown in dotted lines by simply loosening the clamp screw 49. When this has been done, the spindle 46 may be pressed downward to the position shown in dotted lines in Fig. 1, the shaft 36 and the train of gears turning freely as this is done. Rotary motion is imparted to the spindle 46 from the shaft 36 by means of a pair of angle gears 50 and 51, having their teeth set at angles of 45 degrees to their respective faces. These gears remain constantly in mesh in whatever position the bracket 47 may be set.

In order to protect the film as much as possible from wear in its passage through the apparatus I provide special film guide devices shown in Figs. 1 and 3. These guide devices comprise a pair of small, light, flanged guide rollers 52 which are mounted at the top in the film gate and a similar pair of guide rollers 53 which are mounted at the lower end the apron or stripper 54. This apron or stripper is a curved plate of thin metal the upper end of which lies between the toothed ends of the sprocket 6 immediately behind the aperture plate 7 as shown in Fig. 5. The apron curves downward under the sprocket 6 and extends forward to a considerable distance to leave plenty of clearance for the film F as it passes from the sprocket 6 and descends to form a loop before passing to the sprocket 14. Owing to the elasticity of the film it would push out against the apron 54 and rub against it with consequent detriment to the film, if no means were provided to prevent this. The small guide rollers 53 provided at the lower end of the apron are of sufficient diameter to prevent the film coming into contact with the apron unless the film happens to be unusually stiff, and passing over the guide rollers so little surface of contact is presented to the film that no injury can result. The flanges of these guide rollers serve to keep the film properly alined so that it will have no tendency to slip off the lower sprocket 14.

In using the machine as above described the film is put in position on the sprockets as already indicated and the rollers mounted in the spring pressed brackets are moved into position to hold the film thereon, care being taken to form loops in the film of considerable size between the upper sprocket 2 and the guide rollers 52 and between the guide rollers 53 and the lower sprocket 14. The machine is then set in motion by means of the crank 24 or any other suitable driving device. The film will then be fed downward through the machine. The sprockets 2 and 14 will impart continuous movement to the film and the sprocket 6 will impart an intermittent movement reducing the amount of slack in the upper loop and increasing the amount of slack in the lower loop at each partial rotation of the sprocket 6. Owing to the peculiar construction of the members 18 and 19 by which intermittent movement is imparted to the sprocket 6 movement is imparted to the sprocket during only about $\frac{1}{5}$ of the time of rotation of the driving member 18 and the intermittent spindle 11 is held perfectly still during the remainder of the rotation of the driving member 18, because during this time the locking ring 26 provided on the member 18 engages all of the pins 21 on the arms 20 of the cross shaped driven member 19, two of which rest against the inner surface of the locking ring and two against the outer surface. The rotative movement is imparted to the member 19 only when the diamond shaped cam 18$^a$ passes between the pins on the arms of the driven member. At each passage of the diamond shaped cam the member 19 is turned through an angle of 90 degrees, the direction of rotation of the driving and driven members being the same. The cam 18$^a$ is not exactly diamond shaped but is so designed that it will impart an approximately uniform acceleration to the driven member as one of the pins 21 passes along from the forward end of the cam to the outermost angle thereof, after which a substantially uniform rotation is imparted to the driven member as the pin passes from the outermost angle of the cam to its rear extremity. During the period of acceleration one of the pins passes through the rear passageway 27 between the cam and the adjacent end of the locking ring 26 and during the period of rotation another pin passes through the forward passageway 27. These passageways are of just sufficient width to permit the passage of the pins, thus insuring quiet operation of the intermittent movement and preventing lost motion. During the time of movement of the member 19 the shutter 45, which is of ordinary design, cuts off the light from the screen, as usual in moving picture projecting machines in which the film has an intermittent movement.

Details of construction not hereinbefore described but which appear in the drawings form no part of the present invention and are shown merely to complete an operative structure. For that reason, no detailed description of them appears to be necessary herein.

Having thus described my invention what I claim and desire to secure by Letters Patent is:—

1. In a motion picture machine having a stationary aperture through which the picture is projected, a film feeding mechanism for feeding the film past said aperture comprising a vertically adjustable carriage, a feed sprocket mounted on said carriage and means for operating said feed sprocket comprising a driving gear having a stationary axis, a driven gear on said carriage having driving connection with said sprocket and an intermediate gear meshing with both said gears and bodily adjustable in the same direction and simultaneously with said carriage and through a distance having a fixed ratio to the extent of adjustment of said carriage.

2. In a motion picture machine having a stationary aperture through which the picture is projected, a film feeding mechanism for feeding the film past said aperture comprising a vertically adjustable carriage, a feed sprocket mounted on said carriage and means for operating said feed sprocket comprising a driving gear having a stationary axis, a vertically adjustable gear adjacent said carriage and meshing with said driving gear, and a gear on said carriage having driving connection with said feed sprocket and meshing with said last mentioned gear.

3. In a moving picture machine having a stationary aperture through which the picture is projected, a driving shaft mounted in stationary bearings, a shutter driven from said shaft alternately cutting off and exposing the projected picture, means for feeding the film past said aperture, comprising a vertically adjustable carriage, a feed sprocket mounted thereon and having a gear on said carriage having driving connection therewith, a second gear driven from said main driving gear and driving said feed sprocket through the first mentioned gear, and means for adjusting said carriage to register a picture on the film with said aperture, and adjusting said second gear to maintain a fixed relation between the cycle of operations of said shutter and said driving sprocket at all points of adjustment of said sprocket.

4. In a moving picture machine having a stationary aperture through which the picture is projected, means for feeding the film past said aperture comprising a driving gear having a stationary axis, a feed sprocket, a vertically adjustable carriage on which said sprocket is mounted, a second vertically adjustable carriage adjacent said first mentioned carriage, a gear on said first mentioned carriage having driving connection with said sprocket, a gear mounted on said second carriage for transmitting motion from said driving gear to said gear on said first mentioned carriage, and means for simultaneously adjusting said carriages each to a different extent.

5. In a moving picture machine having a stationary aperture through which the picture is projected, means for feeding the film past said aperture comprising a driving gear having a stationary axis, a feed sprocket, a vertically adjustable carriage on which said sprocket is mounted, a second vertically adjustable carriage adjacent said first mentioned carriage, a gear on said first mentioned carriage having driving connection with said sprocket, a gear mounted on said second carriage for transmitting motion from said driving gear to said gear on said first mentioned carriage, means for simultaneously adjusting said carriages comprising a lever having a fixed fulcrum connected at different points in its length to said carriages.

6. In a motion picture projection machine, a stationary frame having an aperture through which the picture is projected, a film feeding mechanism comprising a carriage adjustable toward and from said aperture, a feed sprocket mounted thereon, a gear having connection with said sprocket also mounted on said carriage, a driving gear mounted in said frame for rotation about a stationary axis, an intermediate gear meshing with both said gears, and means for shifting said intermediate gear upon movement of the said carriage in such manner as to maintain said sprocket gear in fixed angular position relative to its own axis of rotation.

7. In a motion picture machine, a frame having an aperture through which the picture is projected, a film feeding mechanism for feeding the film past said aperture comprising an adjustable carriage, a feed sprocket mounted thereon, a gear for driving said sprocket also mounted on said carriage, a driving gear having a stationary axis, an intermediate gear between said driving gear and said first gear constantly meshing with both, and means for shifting said intermediate gear upon adjustment of said carriage to an extent such that the rotation of said sprocket gear produced by the movement of the intermediate gear relative to the driving gear will be equal and opposite to the rotation of said sprocket gear produced by the movement of said gear relative to the intermediate gear.

8. In a motion picture machine, a stationary frame having an aperture, film feeding mechanism for feeding the film past said aperture comprising an adjustable carriage, a feed sprocket mounted on said carriage, a gear having driving connection with said sprocket also mounted on said carriage, a main driving gear having a stationary axis, an intermediate gear between said driving gear and said sprocket gear and constantly in mesh with both, and means for shifting said gear upon adjustment of said carriage in a plane parallel to the plane of adjustment of said carriage.

9. In a motion picture projection machine, a stationary frame having an aperture through which the film is projected, a driving shaft having a stationary axis, a shutter driven from said shaft for alternately cutting off and exposing the projected picture, means for feeding the film past said aperture comprising upper and lower sprockets mounted in said frame and driven from said driving shaft, a carriage mounted in said frame beneath said aperture for adjustment toward and from said aperture, a sprocket mounted on said carriage, a gear also mounted on said carriage with connections between said gear and said sprocket for driving the sprocket intermittently upon continuous rotation of the former, a gear on said main shaft, an intermediate gear between said two first mentioned gears having movement relative to both said gears, and means for adjusting said carriage and simultaneously adjusting said intermediate gear to maintain a fixed relation between the time of operation of said intermittent sprocket and said shutter at all points of adjustment of said carriage.

Signed at New York, in the county of New York, and State of New York, this 31st day of January, 1914.

NICHOLAS POWER.

Witnesses:
J. S. STERRETT.
W. UHLEMANN.